United States Patent [19]

Goebel

[11] 4,369,237
[45] Jan. 18, 1983

[54] MULTI-ELEMENT ANODE STRUCTURES FOR ELECTROCHEMICAL CELLS

[75] Inventor: Franz Goebel, Sudbury, Mass.

[73] Assignee: GTE Products Corporation, Stamford, Conn.

[21] Appl. No.: 319,812

[22] Filed: Nov. 9, 1981

[51] Int. Cl.³ .............................................. H01M 4/02
[52] U.S. Cl. ..................................... 429/218; 429/242
[58] Field of Search .............. 429/218, 241, 242, 196, 429/239, 234

[56] References Cited

U.S. PATENT DOCUMENTS

| | | | |
|---|---|---|---|
| 396,770 | 1/1889 | Sellon | 429/239 |
| 3,508,967 | 4/1970 | Lyall et al. | 429/218 |
| 4,020,248 | 4/1977 | Goebel | 429/218 |
| 4,259,420 | 3/1981 | Feiman et al. | 429/218 |

*Primary Examiner*—Donald L. Walton
*Attorney, Agent, or Firm*—Peter Xiarhos

[57] ABSTRACT

Anode structures for primary electrochemical cells. An anode structure in accordance with a first embodiment of the invention includes a metal screen (e.g., of nickel) and a plurality of spaced-apart lithium anode elements arranged in a predetermined pattern (e.g., row and column) and embedded within the metal screen. A metal frame is connected with and surrounds the metal screen and has an electrical terminal extending therefrom.

An anode structure in accordance with a second embodiment of the invention is similar to that of the first embodiment with the exception that the spaces between the lithium anode elements of the anode structure of the second embodiment are filled with a heat-absorbing porous insulative separator material.

15 Claims, 5 Drawing Figures

MULTI-ELEMENT ANODE STRUCTURES FOR ELECTROCHEMICAL CELLS

CROSS REFERENCE TO RELATED APPLICATION

In co-pending application Ser. No. 319,813, filed concurrently herewith in the name of Franz Goebel and entitled METHOD FOR FABRICATING MULTI-ELEMENT ANODE STRUCTURES FOR ELECTROCHEMICAL CELLS, there is disclosed and claimed methods for fabricating multi-element anode structures for electrochemical cells as disclosed and claimed in the present application.

BACKGROUND OF THE INVENTION

The present invention relates to anode structures and, more particularly, to anode structures for primary electrochemical cells.

Primary electrochemical cells are generally well known and understood by those skilled in the art. One particularly useful primary electrochemical cell, especially for high current drain applications, is a so-called prismatic primary electrochemical cell. Such a cell is described in detail in U.S. Pat. No. 4,086,397, in the names of Franz Goebel and Nikola Marincic, and includes a battery stack enclosed together with an electrolytic solution within a metal housing. The battery stack as used within the cell comprises a large number of generally rectangular cell components including a plurality of anode structures, carbon cathode current collector electrodes, and insulative separators (e.g., of fiberglass) between the anode structures and the carbon cathode current collector electrodes. Each anode structure generally comprises a large rectangular, flat, single, continuous sheet of an oxidizable alkali metal, such as lithium, physically impressed into a flat supporting expanded metal (e.g., nickel) grid, and each of the carbon cathode current collector electrodes comprises an aggregation of porous, semi-rigid carbon globules or conglomerates physically impressed into a flat expanded metal (e.g., nickel) current collector grid. A common and preferred electrolytic solution employed in the cell as described above is a cathodelectrolyte solution comprising a reducible soluble cathode such as thionyl chloride and an electrolyte solute such as lithium tetrachloroaluminate dissolved in the thionyl chloride.

By the appropriate selection of battery cell components and materials, a cell as described above can be constructed to have any one of several possible sizes and energy configurations. A typical cell, for example, has exterior dimensions of approximately 18 inches (height)×13 inches (width)×10 inches (depth), a weight of 156 pounds, an ampere-hour capacity rating of 10,000 ampere-hours, and a nominal discharge current of 40 amperes.

In an electrochemical cell as described hereinabove, it is possible under certain adverse conditions, for example, in the case of severe physical abuse to the cell, for an internal short circuit condition to develop within the cell between metal parts of a pair of anode and cathode structures. In such a case, a hot spot can develop in the lithium sheet of the anode structure and propagate throughout the sheet. If the sheet temperature is high enough, for example, above 180° C., the lithium metal can melt and react violently with the thionyl chloride, or with components of the discharge reaction such as sulfur, or both, resulting in severe, permanent physical damage to the cell.

BRIEF SUMMARY OF THE INVENTION

In accordance with the present invention, an anode structure is provided for an electrochemical cell which offers increased protection against propagation of hot spots in lithium metal when employed in an electrochemical cell. An anode structure in accordance with a first embodiment of the invention includes a metal screen and a plurality of spaced-apart discrete lithium anode elements arranged in a pattern and in physical contact with the metal screen. An anode structure in accordance with a second embodiment of the invention includes a metal screen, a plurality of spaced-apart discrete lithium anode elements arranged in a pattern and in physical contact with the metal screen, and an insulative separator material disposed between the lithium anode elements and in physical contact with the metal screen. In both embodiments of the anode structures, the spacing of the lithium anode elements in the screens minimizes or reduces the possibility of the propagation of hot spots.

BRIEF DESCRIPTION OF THE DRAWING

Various objects, features and advantages of anode structures for electrochemical cells in accordance with the present invention will be apparent from a detailed discussion taken in conjunction with the accompanying drawing in which.

DETAILED DESCRIPTION OF THE INVENTION

Figure 1:
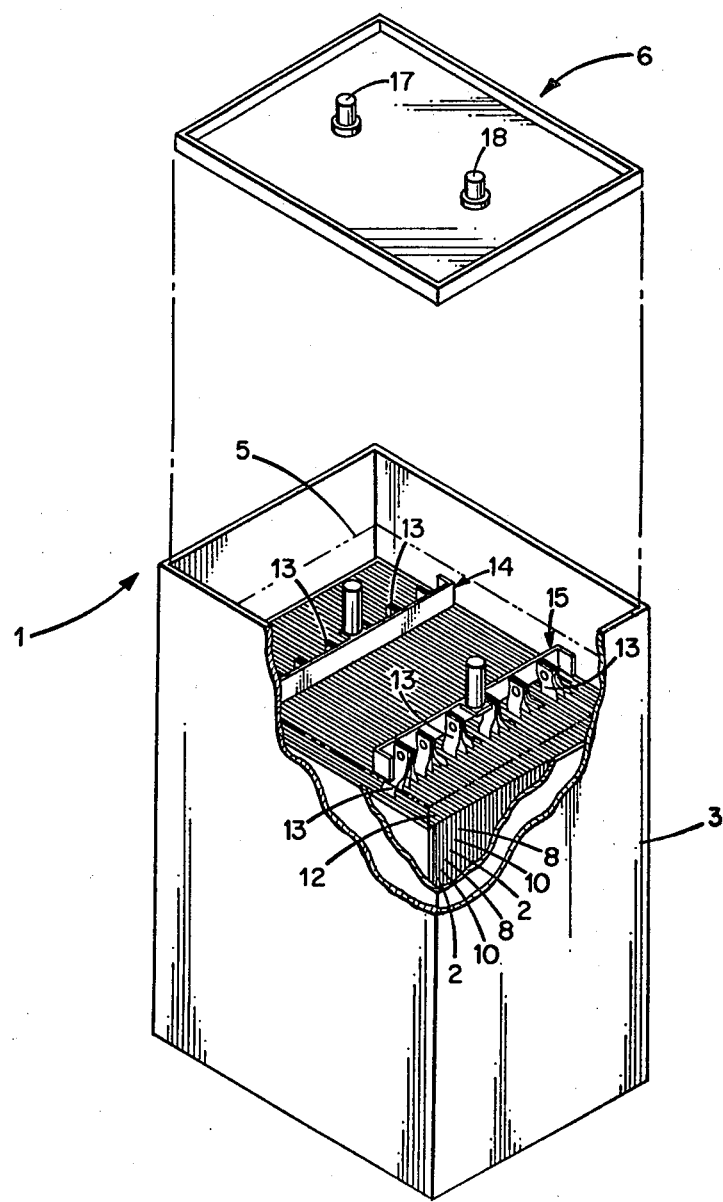
FIG. 1 is a partially exploded perspective view, with parts broken away, of a primary electrochemical cell employing anode structures in accordance with the present invention.

Referring now to FIG. 1, there is shown a primary electrochemical cell 1 employing a plurality of anode structures 2 in accordance with the present invention. The electrochemical cell 1, and the electrochemical system therefor, may be constructed in accordance with the teachings of the aforementioned U.S. Pat. No. 4,086,397 and generally includes a rectangular metal housing 3, a battery stack 4 disposed within the housing 3, an electrolytic solution 5 in contact with the battery stack 4, and a top cover assembly 6. The housing 3 may be of stainless steel and have typical outer dimensions of approximately 18 inches (height)×13 inches (width)×10 inches (depth). The battery stack 4 as employed within the housing 3 comprises a plurality of generally-rectangular cell components. These components include, in addition to the aforementioned plurality of anode structures 2, a plurality of carbon cathode current collector electrodes 8, and a plurality of insulative separators 10 between the anode structures 2 and the carbon cathode current collector electrodes 8. Although not specifically shown in the drawing, each of the carbon cathode current collector electrodes 8 comprises an aggregation of porous semi-rigid carbon globules or conglomerates pressed into a flat expanded metal (e.g., nickel) grid or screen to be supported thereby. The grids of the electrodes 8 also serve as current collector members for the cell 1 during the discharge of the cell. The separators 10, which serve to electrically isolate the anode structures 2 from the carbon cathode current collector electrodes 8, may be of a suitable insulative material such as fiberglass. The anode structures 2 and the carbon cathode current collector electrodes 8 further have narrow portions or rails 12 at the peripheries thereof from which thin metal rectangular tabs 13 extend upwardly for facilitating the physical and electrical connection of the anode structures 2 and the carbon cathode current collector electrodes 8 to corresponding metal (e.g., nickel) bus bar arrangements 14 and 15, respectively. The bus bar arrangements 14 and 15 are in turn mechanically and electrically connected to a pair of metal (e.g., nickel) terminals 17 and 18, respectively, located in, and insulated from, the top cover assembly 6.

Typical dimensions for the battery stack 4 as described hereinabove, corresponding to a total of 47 anode structures and cathode electrodes, are approximately 14.5 inches (height)×12.8 inches (width)×9.8 inches (depth). The electrolytic solution 5 to which the battery stack 4 is exposed and which is compatible with the cell components as described hereinabove is preferably a cathodelectrolyte solution comprising a reducible soluble cathode such as thionyl chloride and an electrolyte solute such as lithium tetrachloroaluminate dissolved in the thionyl chloride.

Figure 2:
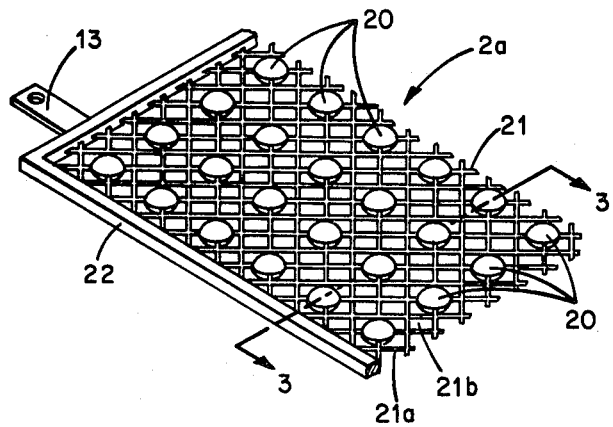
FIG. 2 illustrates an anode structure in accordance with a first embodiment of the invention.
Figure 3:
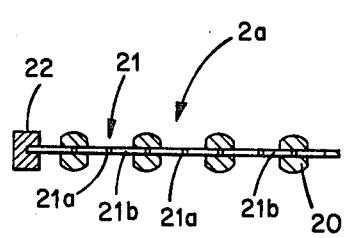
FIG. 3 is a cross-sectional view, taken along the line 3—3 in FIG. 2, of the anode structure of FIG. 2.

Each of the anode structures 2 as described briefly hereinabove may take the form as shown at 2a in FIGS. 2 and 3 or at 2b in FIGS. 4 and 5. The anode structure 2a as shown in FIGS. 2 and 3 comprises a plurality of discrete lithium anode elements 20 embedded within, and physically secured to, a flat rectangular metal grid or screen 21 in a spaced-apart, equi-distant, row and column format. As shown in FIGS. 2 and 3, each of the lithium anode elements 20 has a generally cylindrical overall configuration and a generally circular cross section, although many other shapes are possible, e.g., square, rectangular, oval, etc. In addition, a variety of patterns or layouts other than a row and column pattern may be used.

The lithium anode elements 20 as shown in FIGS. 2 and 3 are selected to have physical dimensions and spacings therebetween such that any hot spot which might occur in any one of the elements 20, for example, as a result of an internal short circuit condition within the associated cell, does not propagate or spread to the other lithium elements 20 and result in melting of the elements 20 and consequential violent reaction with other components or discharge reaction products within the cell. In the particular embodiment of the anode structure shown in FIGS. 2 and 3, the spaces between the lithium anode elements 20 are occupied by the electrolytic solution when the anode structure is actually in place within the cell.

The grid or screen 21 within which the lithium anode elements 20 are embedded is surrounded by a metal (e.g., nickel) frame 22 with an associated tab 13 and may take the form of an expanded metal (e.g., nickel) substrate having interconnected portions 21a defining a large number of openings 21b therein. The lithium anode elements 20, which are softer than the material (nickel) of the screen 21, are pressed into the portions 21a and openings 21b of the screen 21 in a spaced-apart fashion. The anode elements 20 as employed with such a screen may have a typical diameter of ¼ inch and a thickness of 0.040 inch. The particular spacing between the elements 20 depends on the ability of the elements to absorb heat and not transfer the heat to adjacent anode elements. A typical spacing for the elements 20 having the above-specified dimensions is ⅛ inch. A typical thickness for the screen 21 is 0.005 inch.

Figure 4:
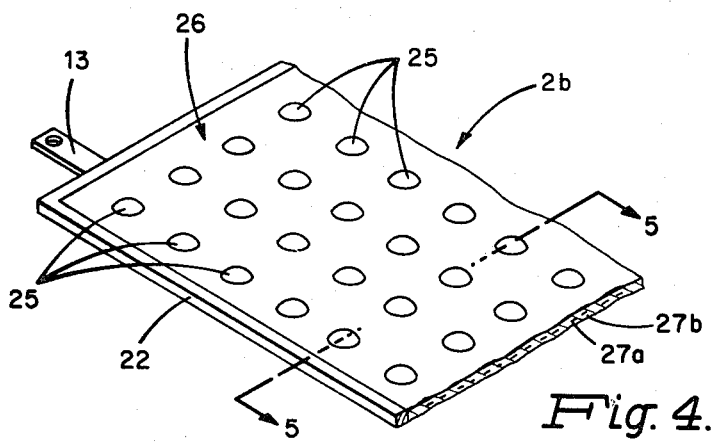
FIG. 4 illustrates an anode structure in accordance with a second embodiment of the invention.
Figure 5:
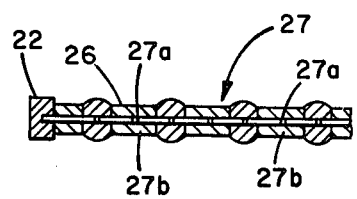
FIG. 5 is a cross-sectional view, taken along the line 5—5 in FIG. 4, of the anode structure of FIG. 4.

The anode structure 2b as shown in FIGS. 4 and 5 is similar to that shown at 2a in FIGS. 2 and 3 with the exception that the lithium anode elements of the anode structure 2b, shown at 25 in FIGS. 4 and 5, have a porous insulative separator material 26 physically interposed between the lithium anode elements 25. Both the anode elements 25 and the material 26 are pressed within metal portions 27a and openings 27b of a flat expanded metal screen 27 (FIG. 5). The insulative material 26 may take the form of a fiberglass powder, a silicate, alumina, or mixtures thereof, or any other suitable insulative separator material, either alone or together with a suitable binder such as "Halar" (ethylene chlorotrifluoroethylene, or ECFE) in low concentration. The size and spacing of the lithium anode elements 25 in this case depends on the ability of the anode elements 25 and the separator material 26 to absorb heat. The separator material 26 is pressed into the grid or screen 27 in any suitable manner, for example, by rolling the material across and into the screen 27, preferably from both sides. Since the separator material 26 is porous in nature, any covering of the lithium anode elements 26 by the separator material 26 is not harmful since the electrolytic solution in the associated cell is able to penetrate the separator material and make contact with the anode elements 25.

Suitable techniques for constructing and assembling the anode structures 2a and 2b shown in FIGS. 2-5 and described hereinabove are disclosed in detail and claimed in the aforementioned co-pending application Ser. No. 319,813.

While there has been described what are considered to be preferred embodiments of the invention, it will be apparent to those skilled in the art that various changes and modifications may be made therein without departing from the invention as called for in the appended claims.

What is claimed is:

1. An anode structure for an electrochemical cell, comprising:
   a metal screen; and
   a plurality of spaced-apart discrete lithium anode elements arranged in a pattern and in physical contact with the metal screen.

2. An anode structure in accordance with claim 1 wherein:
   the metal screen is of a predetermined thickness and has interconnected portions defining a plurality of openings in the screen; and
   the lithium anode elements are embedded within the screen by way of the interconnected portions and openings in the screen.

3. An anode structure in accordance with claim 2 wherein:
   the metal screen is a flat expanded metal screen.

4. An anode structure in accordance with claim 3 wherein:
   the plurality of lithium anode elements are arranged in a pattern of rows and columns.

5. An anode structure in accordance with claim 4 wherein:
   the lithium anode elements in each row are spaced apart from each other by an equal distance.

6. An anode structure in accordance with claim 2 wherein:
   each of the lithium anode elements has a generally cylindrical configuration and a generally circular cross section.

7. An anode structure in accordance with claim 2 further comprising:
   a metal frame connected with and surrounding the metal screen and having an electrical terminal extending therefrom.

8. An anode structure in accordance with claim 1 further comprising:
   a porous insulative separator material disposed between the lithium anode elements and in physical contact with the metal screen.

9. An anode structure in accordance with claim 8 wherein:
   the porous separator material is selected from the group consisting of alumina, fiberglass, a silicate, and mixtures thereof.

10. An anode structure in accordance with claim 8 wherein:
    the metal screen is of a predetermined thickness and has interconnected portions defining a plurality of openings in the screen; and
    the lithium anode elements and the separator material are embedded within the screen by way of the interconnected portions and openings in the screen.

11. An anode structure in accordance with claim 10 wherein:
    the metal screen is a flat expanded metal screen.

12. An anode structure in accordance with claim 11 wherein:
    the plurality of lithium anode elements are arranged in a pattern of rows and columns.

13. An anode structure in accordance with claim 12 wherein:
    the lithium anode elements in each row are spaced apart from each other by an equal distance.

14. An anode structure in accordance with claim 10 wherein:
    each of the lithium anode elements has a generally cylindrical configuration and a generally circular cross section.

15. An anode structure in accordance with claim 10 further comprising:
    a metal frame connected with and surrounding the metal screen and having an electrical terminal extending therefrom.

* * * * *